United States Patent
Makki et al.

(10) Patent No.: US 11,394,487 B2
(45) Date of Patent: Jul. 19, 2022

(54) NON-ORTHOGONAL MULTIPLE ACCESS (NOMA) USING RATE BASED RECEIVERS

(71) Applicant: Telefonaktiebolaget LM Ericsson (publ), Stockholm (SE)

(72) Inventors: Behrooz Makki, Gothenburg (SE); Ali Behravan, Stockholm (SE); Mona Hashemi, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 787 days.

(21) Appl. No.: 16/066,457

(22) PCT Filed: Apr. 6, 2018

(86) PCT No.: PCT/EP2018/058833
§ 371 (c)(1),
(2) Date: Jun. 27, 2018

(87) PCT Pub. No.: WO2019/192718
PCT Pub. Date: Oct. 10, 2019

(65) Prior Publication Data
US 2021/0075539 A1 Mar. 11, 2021

(51) Int. Cl.
*H04L 1/00* (2006.01)
*H04J 11/00* (2006.01)
*H04W 28/02* (2009.01)

(52) U.S. Cl.
CPC ........ *H04L 1/0013* (2013.01); *H04J 11/0043* (2013.01); *H04W 28/0215* (2013.01)

(58) Field of Classification Search
CPC .............. H04L 1/0013; H04W 28/0215; H04J 11/0043
See application file for complete search history.

(56) References Cited

U.S. PATENT DOCUMENTS

| | | | |
|---|---|---|---|
| 9,814,044 B1* | 11/2017 | Sevindik | H04W 16/04 |
| 2009/0017861 A1* | 1/2009 | Wu | H04W 72/1226 455/522 |
| 2014/0119262 A1* | 5/2014 | Park | H04W 4/06 370/312 |
| 2015/0282176 A1* | 10/2015 | MacLeod | H04L 1/24 370/329 |

(Continued)

OTHER PUBLICATIONS

Shipon et al. "Coordinated Multipoint Transmission in Downlink Multi-Cell NOMA Systems", University of Illinois at Urbana-Champaign, pp. 24-31, Apr. 2018 (Year: 2018).*

(Continued)

*Primary Examiner* — Gary Mui
*Assistant Examiner* — Chuong M Nguyen
(74) *Attorney, Agent, or Firm* — Sage Patent Group

(57) ABSTRACT

An adaptive receiver system for UEs using NOMA. For example, a network node (e.g, an access point, such as a base station) obtains a first set of data points for a first decoding scheme, each data point included in the first set of data points identifying a maximum achievable rate for the first UE and a maximum achievable rate for the second UE. The network node uses the first set of data points, a first rate demand for a first UE, and a second rate demand for a second UE to determine a decoding scheme for decoding a message transmitted by one of the first UE and a transmission point of the network node.

11 Claims, 8 Drawing Sheets

(56) References Cited

U.S. PATENT DOCUMENTS

| | | | | |
|---|---|---|---|---|
| 2015/0304089 A1* | 10/2015 | Kim | ............... | H04L 5/0057 370/329 |
| 2016/0128064 A1* | 5/2016 | Su | ............... | H04W 52/267 370/329 |
| 2017/0012695 A1* | 1/2017 | Kim | ............... | H04B 7/15514 |
| 2020/0204301 A1* | 6/2020 | Wu | ............... | H03M 13/618 |

OTHER PUBLICATIONS

Mao et al. "Rate-Splitting for Downlink Multi-User Multi-Antenna Systems", Cornell University Library, Oct. 30, 2017 (Year: 2017).*
3GPP, 3rd Generation Partnership Project; Technical Specification Group Radio Access Network; Study on Network-Assisted Interference Cancellation and Suppression (NAIC) for LTE, (Release 12), 3GPP TR 36.866, V12.0.1, (Mar. 2014), 64 pages.
MediaTek, "New SI Proposal; Study on Downlink Multiuser Superposition Transmission for LTE", 3GPP TSG RAN Meeting #67, RP-150496, Shanghai, China, Mar. 9-12, 2015, 7 pages.
MCC Support, "Final Report of 3GPP TSG RAN WG1 #85 v1.0.0.", 3GPP TSG RAN WG1 Meeting #86, R1-166056, Göteborg, Sweden, Aug. 22-26, 2016, 170 pages.
Xu et al., "NOMA: An Information Theoretic Perspective", arXiv: 1504.07751v2 [cs.IT], May 12, 2015, 6 pages.
First Examination Report dated Nov. 23, 2020 for Indian Patent Application No. 201847024119, 6 pages.
International Search Report and Written Opinion issued in International Application No. PCT/EP2018/058833, dated Feb. 5, 2019, 17 pages.
Ali et al., "Coordinated Multipoint Transmission in Downlink Multi-Cell NOMA Systems: Models and Spectral Efficiency Performance", Technical Report of Wireless Networking Group, Coordinated Science Laboratory; Dept. of Electrical and Computer Engineering; University of Illinois, vol. 25, No. 2, Apr. 1, 2018, pp. 24-31.
Mao et al., "Rate-Splitting for Downlink Multi-User Multi-Antenna Systems: Bridging NOMA and Conventional Linear Precoding", arXiv:1710.11018v1, [cs.IT], Cornell University, Ithaca, NY, Oct. 30, 2017, 12 pages.
Diamantoulakis et al., "Wireless-Powered Communications With Non-Orthogonal Multiple Access", IEEE Service Center, Piscataway, NJ, vol. 15, No. 12, Dec. 1, 2016, 15 pages.

* cited by examiner

NON-ORTHOGONAL MULTIPLE ACCESS (NOMA) USING RATE BASED RECEIVERS

CROSS REFERENCE TO RELATED APPLICATION(S)

This application is a 35 U.S.C. § 371 National Stage of International Patent Application No. PCT/EP2018/058833, filed Apr. 6, 2018, designating the United States, the disclosure of which is incorporated by reference.

TECHNICAL FIELD

Disclosed are embodiments related to non-orthogonal multiple access (NOMA) networks.

BACKGROUND

The design of multiple access schemes is of interest in the design of cellular telecommunication systems. The goal of multiple access schemes is to provide multiple user equipments (UEs) (i.e., wireless communication devices, such as, for example, smartphones, tablets, phablets, smart sensors, wireless Internet-of-Things (IoT) devices, etc., that are capable of wirelessly communicating with an access point) with radio resources in a spectrum, cost, and complexity-efficient manner. In 1G-3G wireless communication systems, frequency division multiple access (FDMA), time division multiple access (TDMA) and frequency division multiple access (CDMA) schemes have been introduced. Long-Term Evolution (LTE) and LTE-Advanced employ orthogonal frequency division multiple access (OFDMA) and single-carrier (SC)-FDMA as orthogonal multiple access (OMA) schemes. Such orthogonal designs have the benefit that there is no mutual interference among UEs, leading to high system performance with simple receivers.

Recently, non-orthogonal multiple access (NOMA) has received considerable attention as a promising multiple access technique for LTE and 5G systems. With NOMA, two or more UEs may share the same radio resources (e.g., time resources, frequency resources, and/or code resources). Particularly, 3GPP has considered NOMA in different applications. For instance, NOMA has been introduced as an extension of the network-assisted interference cancellation and suppression (NAICS) for intercell interference (ICI) mitigation in LTE Release 12 as well as a study item of LTE Release 13, under the name of "Downlink multiuser superposition transmission." Also, in recent 3GPP meetings, it is decided that new radio (NR) should target to support (at least) uplink NOMA, in addition to the OMA approach.

SUMMARY

NOMA outperforms OMA in terms of sum rate. This performance gain, however, comes at the cost of higher decoding delay and receiver complexity. In downlink NOMA, a "cell-center" UE (i.e., a UE having a relatively good channel quality) may be pairs with a "cell-edge" UE (i.e., a UE with a comparatively lower channel quality) and the cell-center UE may use successive interference cancellation (SIC) to first decode and remove the signal of the cell-edge UE and then decode its own signal free of interference. This two-step decoding process by the cell-center UE results in a larger end-to-end transmission delay for the cell-center UE. It also may lead to larger end-to-end delay for the cell-edge UE in cases where their signals need to be synchronized. NOMA-based data transmission also leads to higher receiver complexity compared to conventional OMA-based data transmission.

Certain embodiments disclosed herein provide an adaptive receiver for cell-center UEs using NOMA. The objective is to reduce the complexity and the decoding delay of the receivers. Importantly, the decoding scheme in a UE may be determined based on a demanded rate of downlink transmission. In some embodiments, different decoding schemes may be considered by the cell-center UE depending on the rate demands of the UEs. In such embodiments, the network node may adapt its transmission power and synchronize the signals of the UEs according to the selected decoding scheme.

For instance, in one aspect there is provided a method performed by a network node, wherein the network node serves a first UE and a second UE. The method includes the network node obtaining, for a first decoding scheme, a first set of data points, each data point included in the first set of data points identifying a maximum achievable rate for the first UE and a maximum achievable rate for the second UE. The network node obtains a first rate demand for the first UE and a second rate demand for the second UE. Using the first set of data points, the first rate demand, and the second rate demand, the network node determines a decoding scheme for decoding a message transmitted by one of the first UE and a transmission point of the network node. In some embodiments, the decoding scheme includes using a successive interference cancellation (SIC) receiver to decode a message.

In some embodiments, the step of using the set of data points, the first rate demand, and the second rate demand to determine the decoding scheme includes selecting a data point from the set of data points, wherein selected data points identifies a maximum achievable rate for the first UE that is equal to the rate demand for the first UE; and determining whether the maximum achievable rate for the second UE identified by the selected data point is greater than or equal to the rate demand for the second UE.

In some embodiments, the step of using the set of data points, the first rate demand, and the second rate demand to determine the decoding scheme includes selecting a data point from the set of data points, wherein selected data points identifies a maximum achievable rate for the second UE that is equal to the rate demand for the second UE; and determining whether the maximum achievable rate for the first UE identified by the selected data point is greater than or equal to the rate demand for the first UE.

In another aspect there is provided a method performed by a network node, wherein the network node serves a first UE and a second UE. The method includes the network node obtaining a first rate demand for the first UE and a second rate demand for the second UE. The network node determines a first channel gain for the first UE and a second channel gain for the second UE. Using the first rate demand, the second rate demand, the first channel gain, and the second channel gain, the network node determines a decoding scheme for decoding a message transmitted by one of the first UE and a transmission point of the network node. In some embodiments, the decoding scheme includes using a successive interference cancellation (SIC) receiver to decode a message.

Compared to the conventional NOMA techniques, the embodiments disclosed herein considerably reduce the receiver complexity of the cell-center UE. The proposed method further reduces the end-to-end transmission delay of the network, thereby increasing the end-to-end throughput. For example, the proposed method leads to lower end-to-end transmission delay for both the cell-edge and the cell-center UEs. While the embodiments described in the current disclosure relate to downlink transmission, the same approach is applicable for uplink transmission.

BRIEF DESCRIPTION OF THE DRAWINGS

The accompanying drawings, which are incorporated herein and form part of the specification, illustrate various embodiments.

DETAILED DESCRIPTION

Figure 1:
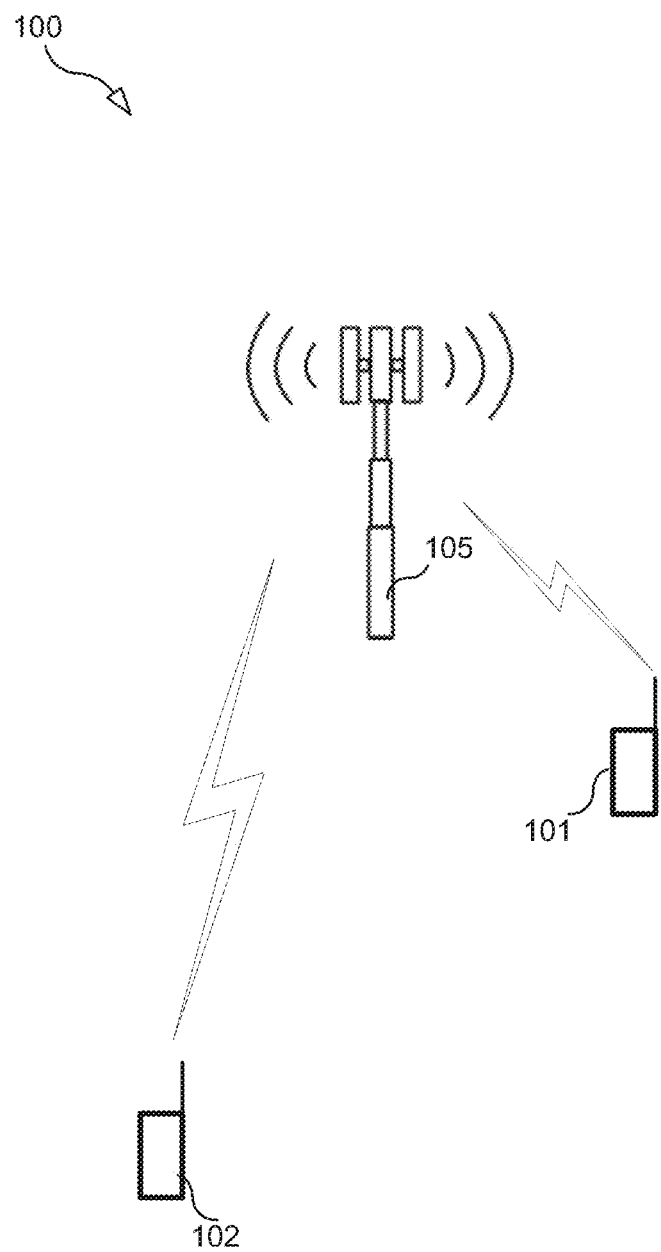
FIG. 1 illustrates a TRP communicating with a UE using a high-gain beam.

FIG. 1 illustrates a network 100 having a network node 105 (e.g., access point (AP) such as, for example, a 4G or 5G base station or other access point) serving a large number of UEs—e.g., UE 101, UE 102, etc. While only two UEs are shown, network node 150 may serve N number of UEs, where N>>2. The UEs connect to the network node 105 using a limited number of spectrum resource blocks, i.e., time-frequency chunks.

In some embodiments, the network 100 may be a conventional downlink NOMA-based network where UE 101 and UE 102 are served by the network node 105 in common spectrum resource blocks. In some instances, the UE 101 may experience a better channel quality compared to the UE 102. In such instances, $|h_1| \geq |h_2|$, where $h_1$ and $h_2$ represents a channel coefficient of the link between the network node 105 and the UE 101 and the UE 102, respectively. The channel gain for each UE is defined as $g_i = |h_i|^2$, where $i=1, 2$.

Using NOMA, the network node 105 may generate and transmit a superimposed signal to both UEs in the same resources in a time slot t. The superimposed signal is given as $S(t) = \sqrt{P_1} X_1(t) + \sqrt{P_2} X_2(t)$. Here, $X_1(t)$ and $X_2(t)$ are the unit-variance message signals and $P_1$ and $P_2$ are the allocated transmit power for UE 101 and UE 102, respectively. Here, P represents a total power of the network node 105 and $P=P_1+P_2$. Accordingly, the signal received by the UEs is given by $$Y_i(t) = h_i(\sqrt{P_1} X_1(t) + \sqrt{P_2} X_2(t)) + Z_i(t), i=1,2, \quad (1)$$

where $Z_i(t)$ denotes the Gaussian white noise added in $UE_i$, i=1, 2 (UE 101 and UE 102, respectively).

Figure 2A:
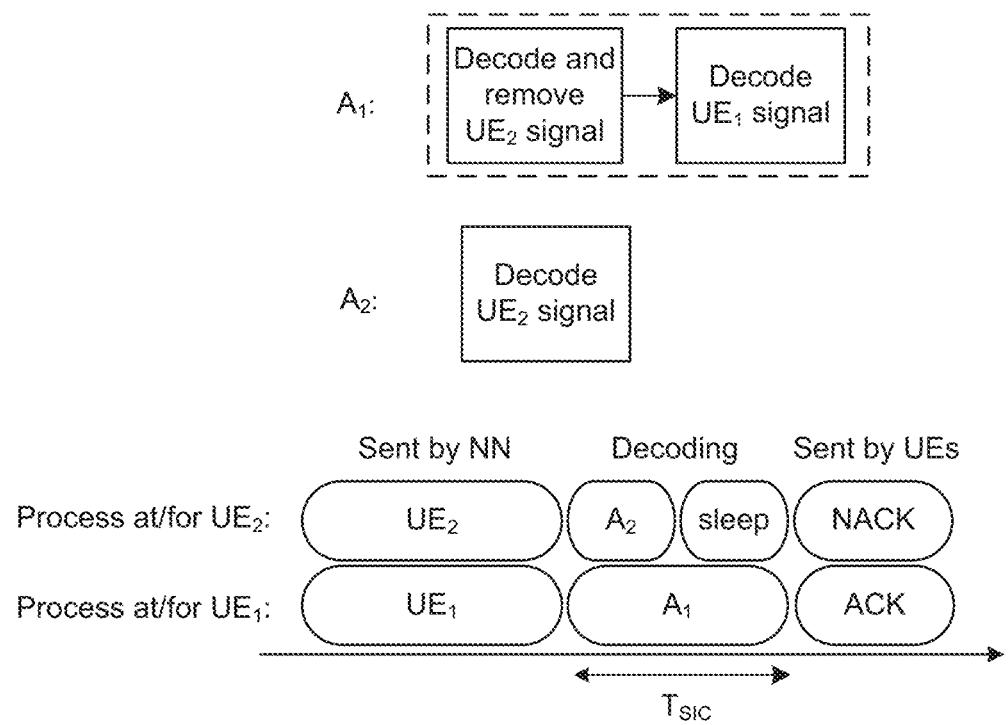
FIGS. 2A-2B illustrate NOMA setups according to some embodiments.

FIG. 2A depicts a first NOMA setup (also referred to as SIC receiver based NOMA) according to some embodiments. As shown in FIG. 2A, $UE_1$, i.e., the UE 101 experiencing a better channel quality, uses a SIC receiver to first decode and remove the message of $UE_2$, i.e., the UE 102 experiencing a worse channel quality, and then decode its own message with no interference. UE 102 uses a non-SIC receiver to decode its own message in the presence of interference due to the UE 101 signal. As shown by $T_{SIC}$ in FIG. 2A, using the SIC receiver results in higher decoding delay compared to using non-SIC receivers. For synchronization of the UEs signals, some delay may be considered by UE 102 or the network node 105 may perform the synchronization. For example, UE 102 may enter a sleep mode until UE 101 completes decoding its message as shown in FIG. 2A.

The goal of each UE is to decode its own message. In some embodiments, a UE may first decode the message of the other UE to reduce the interference. In accordance with the first NOMA setup shown in FIG. 2A, UE 101 uses the SIC receiver to first decode and remove the message of UE 102 and decodes its own message free of interference. UE 102 uses OMA-based receivers to decode its own message and considers the UE 101 message as interference. UE 102 uses OMA-based receivers because it can be theoretically shown that there is no chance that UE 102 can first decode and remove the message of UE 101 and subsequently decode its own message free of interference in the first NOMA setup shown in FIG. 2A. Accordingly, in the first NOMA setup, the maximum achievable rates for UE 101 and UE 102 is given by:

$$\begin{cases} R_1 = \log_2(1 + P_1 g_1) & (i) \\ R_2 = \log_2\left(1 + \dfrac{P_2 g_2}{1 + P_1 g_2}\right), & (ii) \end{cases} \quad (2)$$

The SIC receiver is a high-complexity receiver compared to conventional OMA-based receivers. Using the SIC receiver results in larger decoding delay due to the two step decoding process. Such decoding delay of UE 101 affects the end-to-end transmission delay of both UEs in cases where the signals of UE 101 and UE 102 need to be synchronized. Different methods can be applied to synchronize the signals. For example, $UE_2$ may enter a sleep mode, as shown in FIG. 2A, or the network node 105 may perform the synchronization.

Figure 2B:
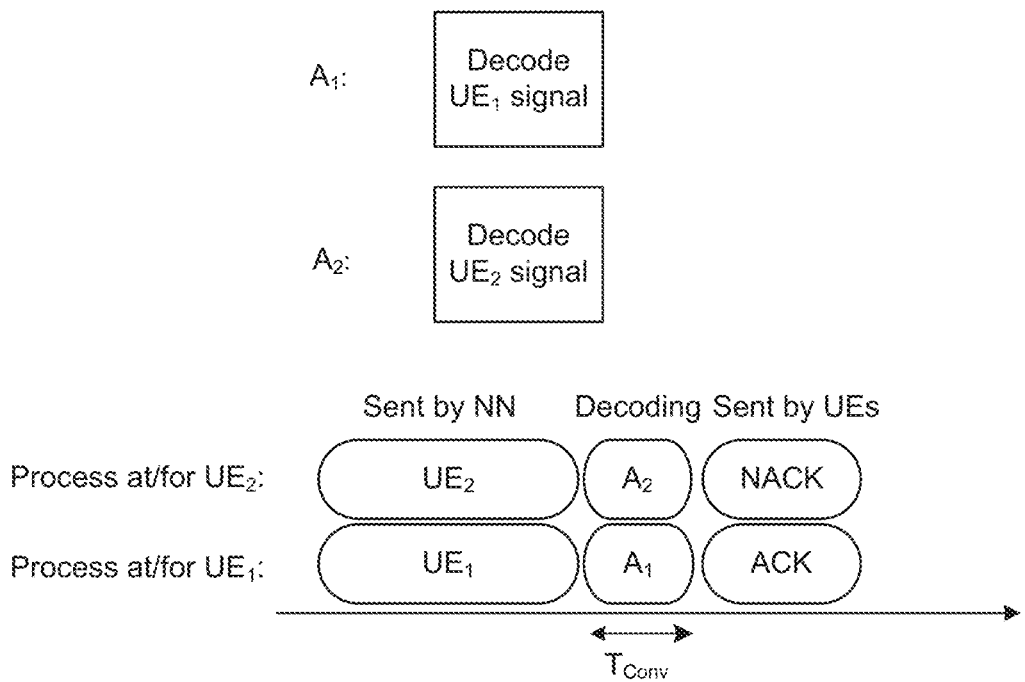

FIG. 2B depicts a second NOMA setup (also referred to as OMA receiver based NOMA) according to some embodiments. In the second NOMA setup shown in FIG. 2B, both UEs utilize a conventional OMA-based receiver. That is, UE 101 does not use a SIC receiver as opposed to the first NOMA setup shown in FIG. 2A. In this NOMA setup, the maximum achievable rates for UE 101 and UE 102 is given by:

$$\begin{cases} \tilde{R}_1 = \log_2\left(1 + \dfrac{P_1 g_1}{1 + P_2 g_1}\right) & (i) \\ \tilde{R}_2 = \log_2\left(1 + \dfrac{P_2 g_2}{1 + P_1 g_2}\right), & (ii) \end{cases} \quad (3)$$

As shown in FIG. 2B, each of the UEs use OMA-based receivers to decode its own message in the presence of interference caused by the other UE message. The use of conventional receivers and decoders allows lower implementation complexity and decoding delay compared to using SIC based receivers, as shown by $T_{Conv}$ in FIG. 2B.

In the second NOMA setup, each of the UEs decodes its message of interest in one step and considers the other UE message as interference. This allows decoding delay due to the two-step decoding process shown in FIG. 2A to be removed which considerably reduces the decoder complexity and network end-to-end transmission delay.

In some embodiments, the network node 105 may allocate all power and frequency resources to one of the UEs in a time slot. In such embodiments, the other UE is not served in that time slot. When the network node 105 allocates all the power and time-frequency resources to UE 101, the maximum achievable rates for UE 101 and UE 102 is given by:

$$\begin{cases} R_{1,max} = \log_2(1 + Pg_1) & (i) \\ R_2 = 0, & (ii) \end{cases} \quad (4)$$

When the network node 105 allocates all the power and time-frequency resources to UE 102, the maximum achievable rates for UE 101 and UE 102 is given by:

$$\begin{cases} R_1 = 0 & (i) \\ R_{2,max} = \log_2(1 + Pg_2), & (ii) \end{cases} \quad (5)$$

Figure 3:
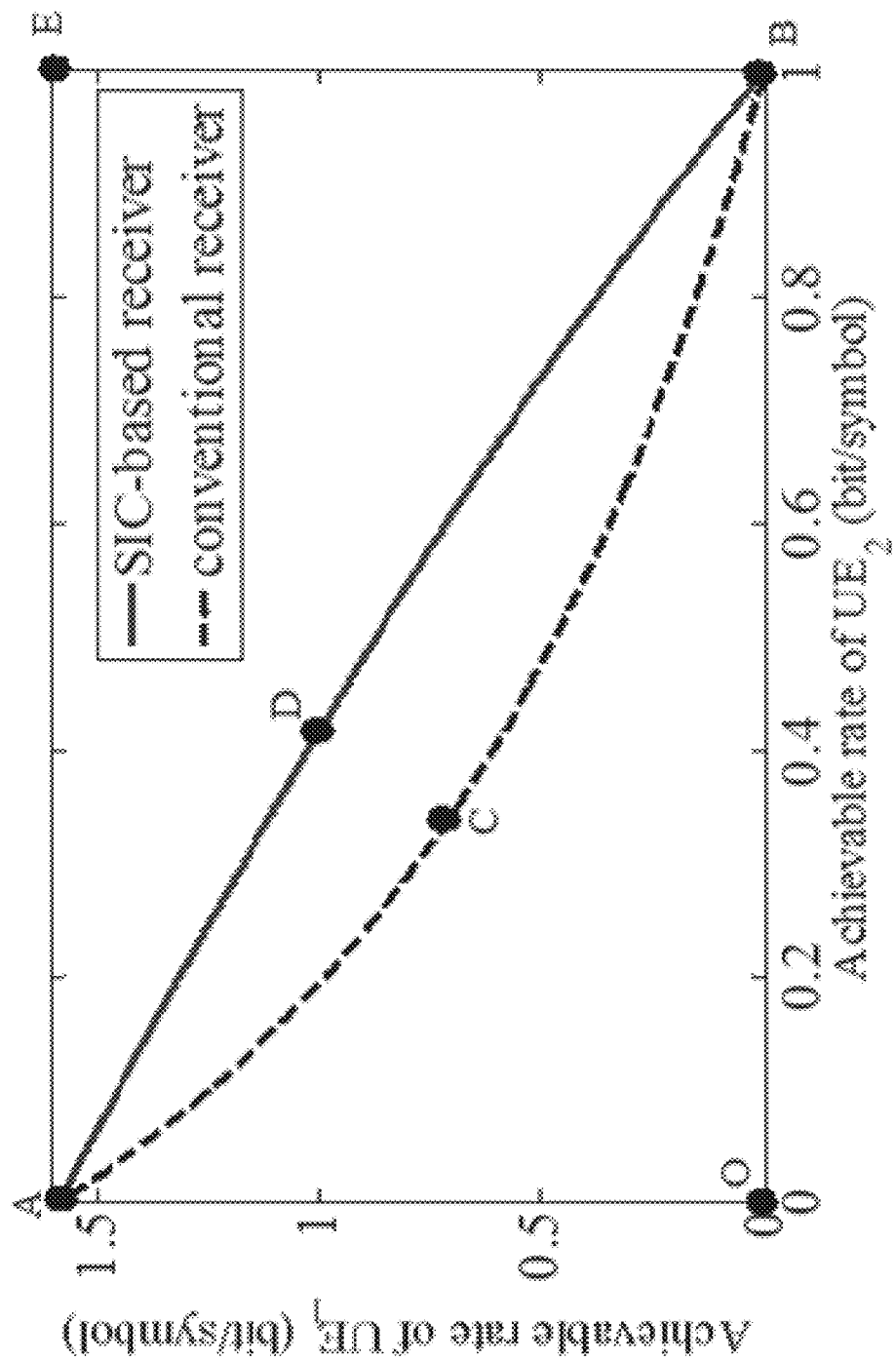
FIG. 3 illustrates the achievable rates for UEs using different data transmission schemes and decoding methods according to one embodiment.

FIG. 3 illustrates the achievable rates given by (2)-(5) and described above for different data transmission schemes and decoding methods for the UEs. As shown in FIG. 3, the achievable rates given by (2) for the SIC receiver based NOMA correspond to region AOBD. The achievable rates given by (3) for the OMA receiver based NOMA correspond to region AOBC. Point A corresponds to the achievable rates given by (4) where the network node 105 allocates all power and time-frequency resources to UE 101. Point B corresponds to the achievable rates given by (5) where the network node 105 allocates all power and time-frequency resources to UE 102. In some embodiments, the achievable rates shown in FIG. 3 may be based on a NOMA setup where the total power of the network node 105 (P) is 40 dBm, a channel gain for UE 101 ($g_1$) is 0.2, and a channel gain for UE 102 ($g_2$) is 0.1.

An embodiment of adaptive decoding schemes where the SIC receiver is only used when required is explained as follows. In this embodiment, the appropriate receiver for UE 101 is determined based on the rate demands of the UEs and the quality of the links between the network node 105 and the UEs. Here, the rate demand of UE 101 and UE 102 is given as $r_i$, i=1, 2. Further, $(r_1, r_2) \in \Re (X)$ indicates that rate demands $r_1$ and $r_2$ are in region X.

Step 1: The UEs (e.g., UE 101 and UE 102) send pilot signals to the network node 105.

Step 2: Using the pilot signals, the network node 105 determines the channel gains ($g_1$ and $g_2$) for the channels between the network node 105 and UE 101 and UE 102.

Step 3: Using the rate demands of the UEs ($r_1$ and $r_2$), i.e., the data rate of interest or the buffered data size, the network node 105 uses achievable rates given by (2)-(5) to determine the appropriate decoding scheme of UE 101. Referring now to FIG. 3, an embodiment of the procedure for determining the appropriate decoding scheme of UE 101 is as follows:

Step 3(a): If $(r_1, r_2) \in \Re$ (AOBC), the network node 105 selects an OMA-based receiver for UE 101. Accordingly, UE 101 does not decode the UE 102 message and considers it as interference. The network node 105 further optimizes the power allocation for the UEs based on the achievable rates given by (3) to find the optimal power allocation which guarantees the rate demands.

Step 3(b): If $(r_1, r_2) \in \Re$ (ACBD), the network node 105 selects a SIC-based receiver for UE 101. Accordingly, UE 101 first decodes and removes the UE 102 message and subsequently decodes the UE 101 message free of interference. The network node 105 further optimizes the power allocation for the UEs based on the achievable rates given by (2) to find the optimal power allocation which guarantees the rate demands.

Step 3(c): If $(r_1, r_2) \in \Re$ (ADBE), it is not possible for the network node 105 to support the rate demands of both UEs simultaneously. In order to provide the UEs according to their rate demands, different schemes may be considered. For example, the total transmit power (P) of the network node 105 can be increased in one scheme. As another exemplary scheme, the UEs may be scheduled in different time slots where their rate demands can each be supported based on the achievable rates given by (4) and (5). The network node 105 may adapt power allocation for the UEs depending on the selected scheme.

For simplicity of explanation, the rate demands of the UEs are limited to their maximum achievable rates, i.e., $r_1 \leq R_{1,max}$ and $r_2 \leq R_{2,max}$, in the embodiments described herein. In some embodiments, however, the rate demands of the UEs may be higher than the maximum achievable rates. In order to support the rate demands of the UEs in such embodiments, region ADBE is expanded by increasing the transmit power (P) of the network node 105 or step 3(c) is performed.

Step 4: The network node 105 informs both UEs about the selected decoding scheme of UE 101. In some embodiments, the network node 105 transmits an indication to the UEs indicating the selecting decoding scheme of UE 101.

Step 5: Depending on the selected decoding scheme of UE 101, both UEs synchronize transmit and/or receive timings. For example, UE 102 may enter a sleep mode until UE 101 completes decoding the UE 101 message as shown in FIG. 2A.

With the proposed scheme, both the end-to-end transmission delay of the NOMA-based setup and the implementation complexity of the UE 101 receiver are considerably decreased.

In the embodiments described herein, the proposed scheme describes extreme cases where the cell-center UE, i.e., UE 101, either uses SIC or conventional OMA-based receivers. This is not required, however, and different suboptimal decoding schemes with different complexities and decoding delays may be used in alternative embodiments of NOMA transmission. The proposed scheme described herein is applicable to every combination of different decoders at UE 101 where each decoding scheme corresponds to a specific region for the achievable rates of the UEs as shown in FIG. 3.

While the embodiments described herein are directed to downlink transmission, the proposed scheme is applicable to uplink transmission. In some embodiments, the network node 105 may consider different decoding schemes based on the rate demands of the UEs and the quality of the channels. In such embodiments, the UEs may adapt their transmit power according to the decoding scheme selected by the network node 105.

Figure 4:
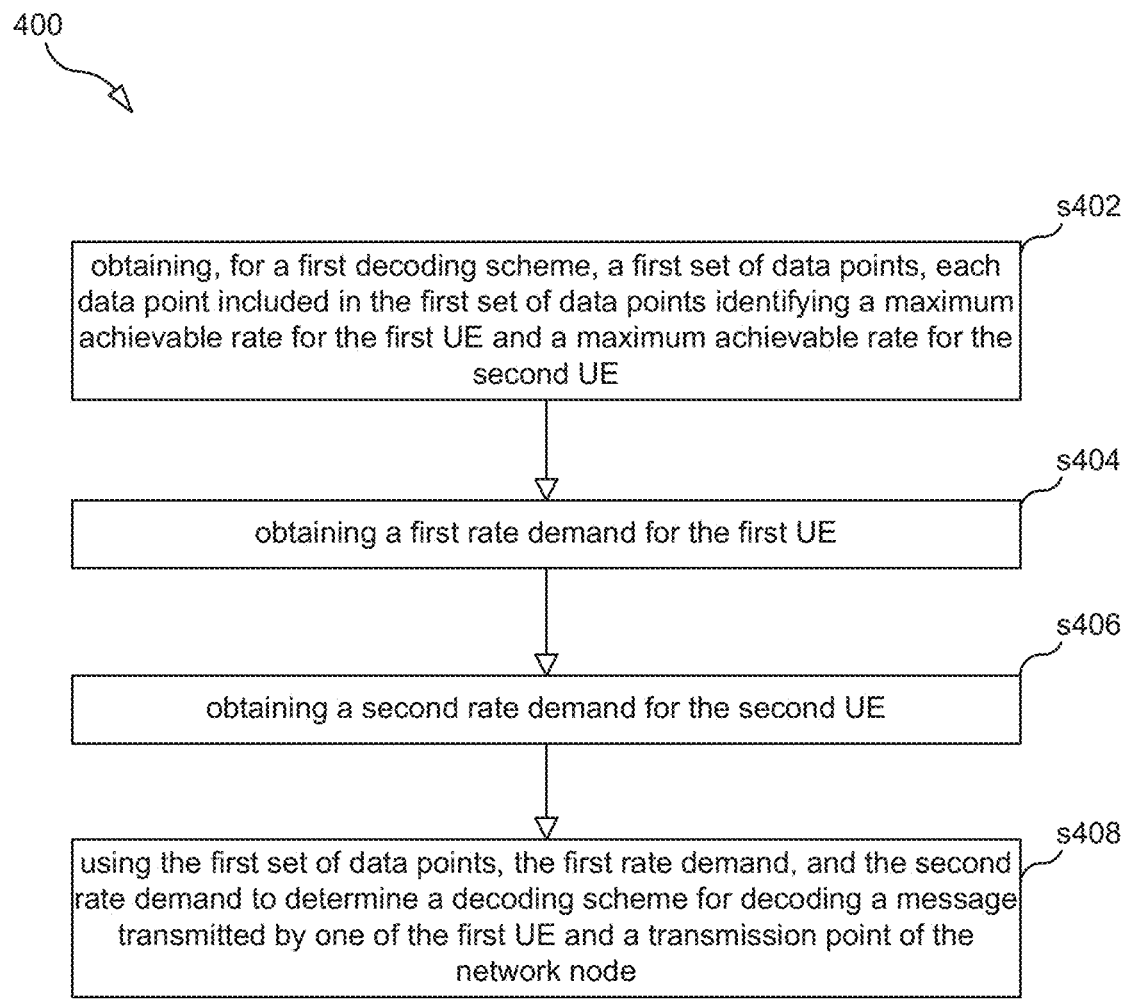
FIG. 4 is a flow chart illustrating a process according to one embodiment.

FIG. 4 is a flow chart illustrating a process 400, according to some embodiments, that is performed by a network node 105, wherein the network node serves a first UE (UE 101) and a second UE (UE 102). Process 400 may begin with step s402 in which network node 105 obtains, for a first decoding scheme, a first set of data points, each data point included in the first set of data points identifying a maximum achievable rate for the first UE and a maximum achievable rate for the second UE. In step s404, the network node obtains a first rate demand for the first UE. In step s406, the network node obtains a second rate demand for the second UE. In step s408, the network node determines, using the first set of data points, the first rate demand, and the second rate demand, a decoding scheme for decoding a message transmitted by one of the first UE and a transmission point of the network node. In some embodiments, the decoding scheme includes using a successive interference cancellation (SIC) receiver to decode a message.

In some embodiments, the step of using the set of data points, the first rate demand, and the second rate demand to determine the decoding scheme includes selecting a data point from the set of data points, wherein selected data points identifies a maximum achievable rate for the first UE that is equal to the rate demand for the first UE; and determining whether the maximum achievable rate for the second UE identified by the selected data point is greater than or equal to the rate demand for the second UE.

In some embodiments, the step of using the set of data points, the first rate demand, and the second rate demand to determine the decoding scheme includes selecting a data point from the set of data points, wherein selected data points identifies a maximum achievable rate for the second UE that is equal to the rate demand for the second UE; and determining whether the maximum achievable rate for the first UE identified by the selected data point is greater than or equal to the rate demand for the first UE.

Figure 5:
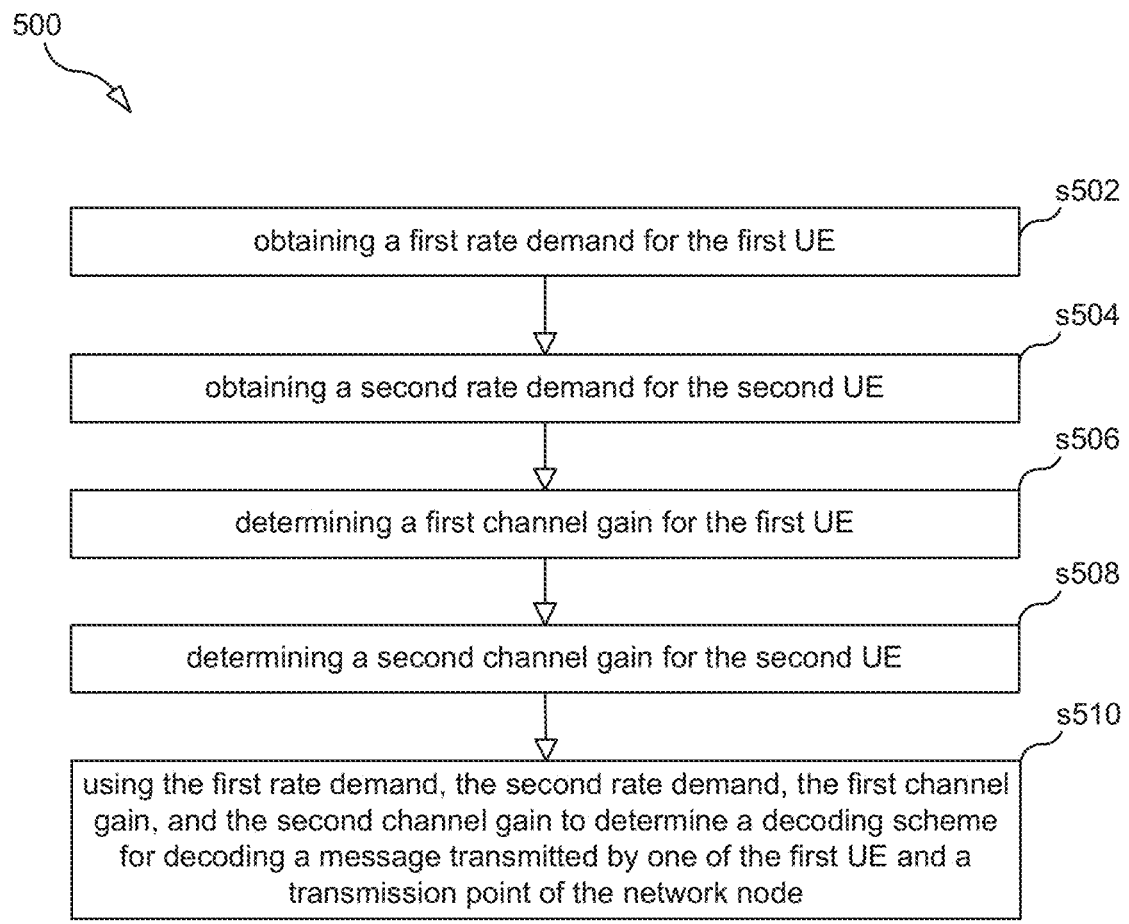
FIG. 5 is a flow chart illustrating a process according to one embodiment.

FIG. 5 is a flow chart illustrating a process 500, according to some embodiments, that is performed by a network node 105, wherein the network node serves a first UE (UE 101) and a second UE (UE 102). Process 500 may begin with step s502 in which network node obtains a first rate demand for the first UE. In step s504, the network node obtains a second rate demand for the second UE. In step s506, the network node determines a first channel gain for the first UE. In step s508, the network node determines a second channel gain for the second UE. In step s510, the network node determines, using the first rate demand, the second rate demand, the first channel gain, and the second channel gain, a decoding scheme for decoding a message transmitted by one of the first UE and a transmission point of the network node. In some embodiments, the decoding scheme includes using a successive interference cancellation (SIC) receiver to decode a message.

Figure 6:
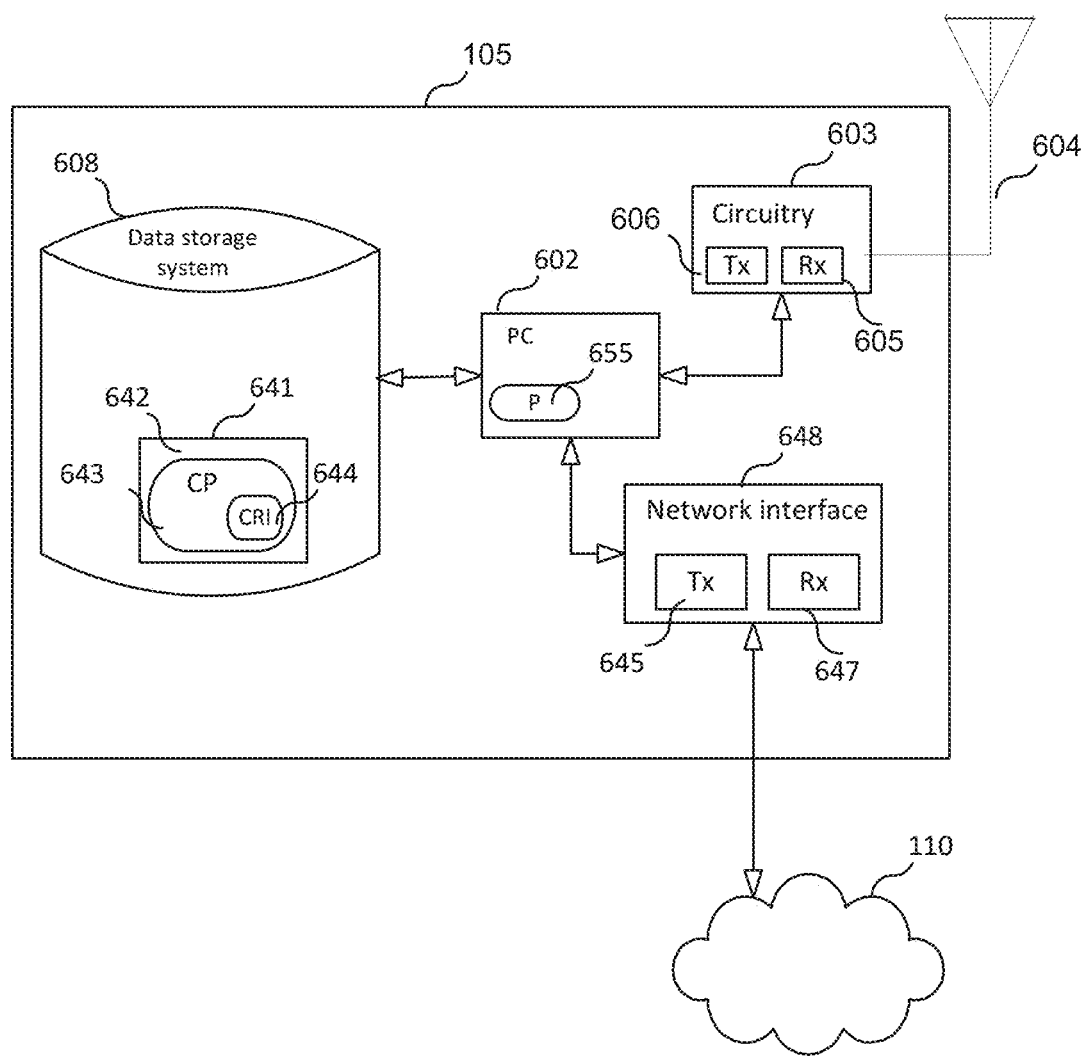
FIG. 6 is a block diagram of a network node according to one embodiment.

FIG. 6 is a block diagram of network node 105 according to some embodiments. As shown in FIG. 6, network node 105 may comprise: a processing circuit (PC) 602, which may include one or more processors (P) 655 (e.g., a general purpose microprocessor and/or one or more other processors, such as an application specific integrated circuit (ASIC), field-programmable gate arrays (FPGAs), and the like); a network interface 648 comprising a transmitter (Tx) 645 and a receiver (Rx) 647 for enabling network node 105 to transmit data to and receive data from other nodes connected to a network 110 (e.g., an Internet Protocol (IP) network) to which network interface 648 is connected; circuitry 603 (e.g., radio transceiver circuitry comprising an Rx 605 and a Tx 606) coupled to an antenna system 604 for wireless communication with UEs); and local storage unit (a.k.a., "data storage system") 608, which may include one or more non-volatile storage devices and/or one or more volatile storage devices (e.g., random access memory (RAM)). In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited to, magnetic media (e.g., a hard disk), optical media, memory devices (e.g., random access memory, flash memory), and the like. In some embodiments, the CRI 644 of computer program 643 is configured such that when executed by data processing apparatus 602, the CRI causes network node 105 to perform steps described herein (e.g., steps described herein with reference to the flow charts and/or message flow diagrams). In other embodiments, network node 105 may be configured to perform steps described herein without the need for code. That is, for example, PC 602 may consist merely of one or more ASCs. Hence, the features of the embodiments described herein may be implemented in hardware and/or software.

Figure 7:
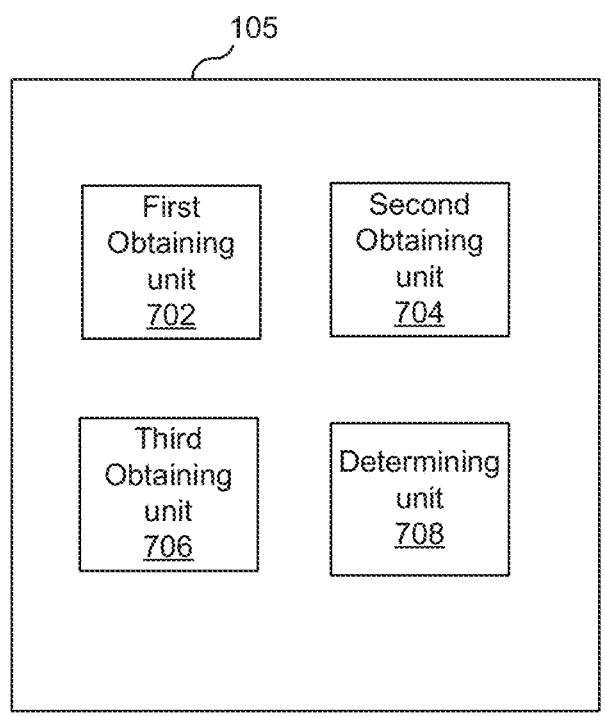
FIG. 7 is a diagram showing functional units of a network node according to one embodiment.

FIG. 7 is a diagram showing functional units of network node 105 according to some embodiments. As shown in FIG. 7, network node 105 includes a first obtaining unit 702 for obtaining, for a first decoding scheme, a first set of data points, each data point included in the first set of data points identifying a maximum achievable rate for the first UE and a maximum achievable rate for the second UE; a second obtaining unit 704 for obtaining a first rate demand for the first UE; a third obtaining unit 706 for obtaining a second rate demand for the second UE; and a determining unit 708 for determining, using the first set of data points, the first rate demand, and the second rate demand, a decoding scheme for decoding a message transmitted by one of the first UE and a transmission point of the network node.

Figure 8:
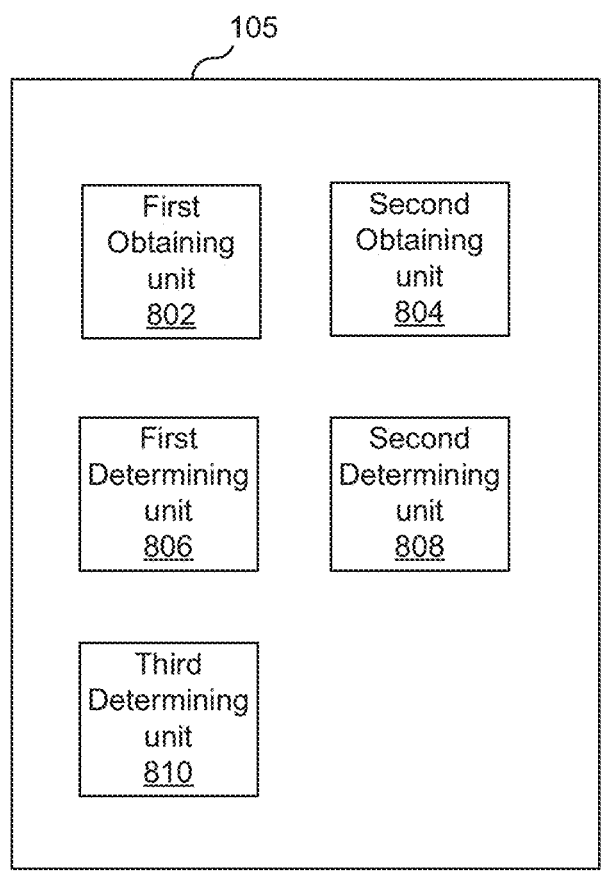
FIG. 8 is a diagram showing functional units of a network node according to one embodiment.

FIG. 8 is a diagram showing functional units of network node 105 according to some embodiments. As shown in FIG. 8, network node 105 includes a first obtaining unit 802 for obtaining a first rate demand for the first UE; a second obtaining unit 804 for obtaining a second rate demand for the second UE; a first determining unit 806 for determining a first channel gain for the first UE; a second determining unit 808 for determining a second channel gain for the second UE; and a third determining unit 810 for determining, using the first rate demand, the second rate demand, the first channel gain, and the second channel gain, a decoding scheme for decoding a message transmitted by one of the first UE and a transmission point of the network node.

Also, while various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a network node, wherein the network node serves a first user equipment, (UE) and a second UE using Non-Orthogonal multiple access (NOMA), the method comprising:

for a decoding scheme, obtaining a first set of data points, each data point included in the first set of data points identifying a maximum achievable rate for the first UE and a maximum achievable rate for the second UE;

obtaining a first rate demand for the first UE;
obtaining a second rate demand for the second UE; and
using the first set of data points, the first rate demand, and the second rate demand to determine the decoding scheme for decoding a message transmitted by one of the first UE and a transmission point of the network node,
wherein determining the decoding scheme comprises:
selecting a data point from the set of data points, wherein selected data point identifies a maximum achievable rate for the first UE that is equal to the rate demand for the first UE; and
determining whether the maximum achievable rate for the second UE identified by the selected data point is greater than or equal to the rate demand for the second UE,
wherein the decoding scheme comprises using a successive interference cancellation (SIC) receiver by the first UE and a conventional OMA based receiver by the second UE to decode the message.

2. The method of claim 1, wherein using the first set of data points, the first rate demand, and the second rate demand to determine the decoding scheme comprises:
selecting a data point from the set of data points, wherein selected data point identifies a maximum achievable rate for the second UE that is equal to the rate demand for the second UE; and
determining whether the maximum achievable rate for the first UE identified by the selected data point is greater than or equal to the rate demand for the first UE.

3. The method of claim 2, wherein the decoding scheme comprises using a conventional OMA-based receiver by the first UE and the second UE to decode the message.

4. A method performed by a network node, wherein the network node serves a first user equipment, (UE) and a second UE using Non-Orthogonal multiple access (NOMA), the method comprising:
obtaining a first rate demand for the first UE;
obtaining a second rate demand for the second UE;
receiving one or more pilot signals from the first UE and the second UE;
using the received pilot signals, determining a first channel gain for the first UE;
determining a second channel gain for the second UE; and
using the first rate demand, the second rate demand, the first channel gain, and the second channel gain to determine a decoding scheme for decoding a message transmitted by one of the first UE and a transmission point of the network node, wherein determining the decoding scheme comprises:
selecting a data point from the set of data points, wherein selected data point identifies a maximum achievable rate for the first UE that is equal to the rate demand for the first UE; and
determining whether the maximum achievable rate for the second UE identified by the selected data point is greater than or equal to the rate demand for the second UE,
wherein the decoding scheme comprises using a successive interference cancellation (SIC) receiver by the first UE and a conventional OMA based receiver by the second UE to decode the message.

5. The method of claim 4, wherein the decoding scheme comprises using a successive interference cancellation (SIC) receiver to decode a message.

6. A network node serving a first user equipment (UE) and a second UE using Non-Orthogonal multiple access (NOMA), comprising:
a processor; and
a memory storing instructions that, when executed by the processor, cause the network node to:
for a decoding scheme, obtain a first set of data points, each data point included in the first set of data points identifying a maximum achievable rate for the first UE and a maximum achievable rate for the second UE;
obtain a first rate demand for the first UE;
obtain a second rate demand for the second UE; and
use the first set of data points, the first rate demand, and the second rate demand to determine the decoding scheme for decoding a message transmitted by one of the first UE and a transmission point of the network node,
wherein in determining the decoding scheme, the network node is further adapted to:
select a data point from the set of data points, wherein selected data point identifies a maximum achievable rate for the first UE that is equal to the rate demand for the first UE; and
determine whether the maximum achievable rate for the second UE identified by the selected data point is greater than or equal to the rate demand for the second UE, wherein the decoding scheme comprises using a successive interference cancellation (SIC) receiver to decode the message.

7. The network node of claim 6, wherein using the set of data points, the first rate demand, and the second rate demand to determine the decoding scheme comprises the network node being further adapted to:
select a data point from the set of data points, wherein selected data point identifies a maximum achievable rate for the second UE that is equal to the rate demand for the second UE; and
determine whether the maximum achievable rate for the first UE identified by the selected data point is greater than or equal to the rate demand for the first UE.

8. A network node serving a first user equipment (UE) and a second UE using Non-Orthogonal multiple access (NOMA), comprising:
a processor; and
a memory storing instructions that, when executed by the processor, cause the network node to:
obtain a first rate demand for the first UE;
obtain a second rate demand for the second UE;
receive one or more pilot signals from the first UE and the second UE;
using the received pilot signals, determine a first channel gain for the first UE;
determine a second channel gain for the second UE; and
use the first rate demand, the second rate demand, the first channel gain, and the second channel gain to determine the decoding scheme for decoding a message transmitted by one of the first UE and a transmission point of the network node, wherein determining the decoding scheme comprises:
selecting a data point from the set of data points, wherein selected data point identifies a maximum achievable rate for the first UE that is equal to the rate demand for the first UE; and
determining whether the maximum achievable rate for the second UE identified by the selected data point is greater than or equal to the rate demand for the second UE, wherein the decoding scheme comprises using a successive interference cancellation (SIC) receiver by the first UE and a conventional OMA based receiver by the second UE to decode the message.

9. The network node of claim 8, wherein the decoding scheme comprises using a successive interference cancellation (SIC) receiver to decode a message.

10. A computer program product comprising a non-transitory computer readable medium storing a computer program comprising instructions which, when executed by processing circuitry, causes the processing circuitry to carry out the method of claim 1.

11. A computer program product comprising a non-transitory computer readable medium storing a computer program comprising instructions which, when executed by processing circuitry, causes the processing circuitry to carry out the method of claim 4.

* * * * *